Aug. 16, 1932.                H. MEYER                1,871,548
                               HOG RING
                          Filed April 17, 1931
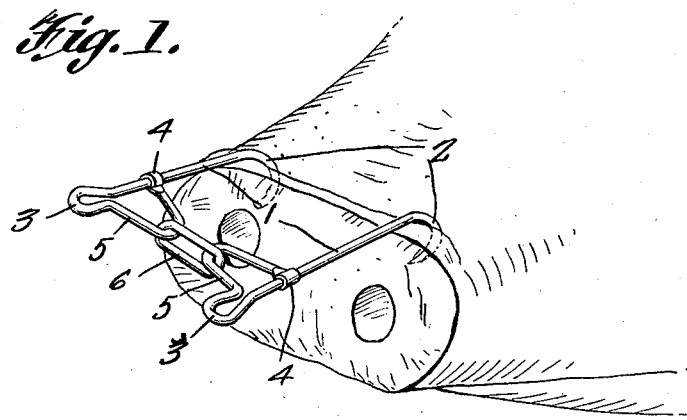
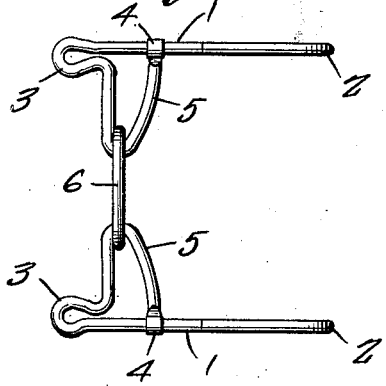
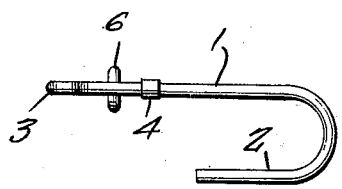
Henry Meyer,
INVENTOR
BY Victor J. Evans and Co.
ATTORNEY Patented Aug. 16, 1932

1,871,548

UNITED STATES PATENT OFFICE

HENRY MEYER, OF RHINELAND, MISSOURI

HOG RING

Application filed April 17, 1931. Serial No. 530,951.

My present invention has reference to a hog ring, that is, a device that is applied to the snout of the hog to prevent the animal from rooting.

The object of this invention is the provision of a hog ring which can be easily and quickly attached to the tip of the animal's snout, which will not be subjected to the wear of the usual rings for this purpose, which cannot be accidentally removed from the animal regardless of pressure by the animal exerted thereagainst and which will effectively prevent the animal from rooting without interfering with the feeding of the animal.

A further object is the provision of a ring which may be attached to the tip of an animal's snout and which includes two side members, each having hooked inner ends to be applied to the animal, the outer ends being rounded and from thence formed with inwardly directed loops whose free arms are formed with rings to surround the rods proper and said loops being connected by a link, and whereby the outer end of the ring is resiliently connected and which ring in effect affords a poke that will not only prevent the animal from rooting but from traveling through fences, etc.

To the attainment of the foregoing the invention consists in the improvement hereinafter described and definitely claimed.

In the drawing:

Figure 1 is a perspective view of the improvement in applied position.

Figure 2 is a top plan view thereof.

Figure 3 is a side elevation thereof.

As disclosed by the drawing my improvement is wholly constructed of metal and includes two normally parallel rods 1 that have what I will term their inner ends rounded upon themselves to form hooks 2. These hooks are designed to be arranged over the snout of the animal and to be inserted through the tip of the animal's snout. The arms 1 are of a length to permit of the same extending a suitable distance beyond the snout of the animal and these arms have their outer ends rounded upon themselves to provide eye-like portions 3. From the eyes the inner ends of the rods are extended toward each other and from thence rounded, brought toward the arms 1 and formed with eyes 4 that are arranged around the arms 1. The bent portions just described provide the arms with substantially U-shaped loops 5, and the loops on the respective arms 1 are connected by a link 6.

My improvement is of an extremely simple construction, may be secured upon the animal in an easy manner. The arms are arranged parallel with respect to the top of the animal's snout, projecting a suitable distance therebeyond. The link 6 holds the arms 1 parallel and if brought in direct contact with an obstacle will serve to twist the said arms and cause the infliction of pain to the animal which will prevent rooting or an attempt of the animal to pass over or through obstacles. The rounded or eye ends 3 also serve as contact elements and are arranged parallel with the arms 1 as clearly disclosed by Figure 3 of the drawing.

It is thought that the foregoing description will fully and clearly set forth the simplicity of the construction and the advantages thereof to those skilled in the art to which such invention relates so that further detailed description will not be required.

Having described the invention, I claim:

1. A link hog ring comprising a pair of rods having hooked ends, inwardly extending loops adjacent to their outer ends and a link connecting the loops.

2. A hog ring comprising two rods, each having one of its ends rounded to provide a hook, the outer end of each of the rods being rounded upon itself to form an eye and from thence extended laterally, rounded upon itself and continued toward the rod and having an eye end which is arranged around the rod, said lateral portions providing loops that are designed to be disposed opposite each other, and a link connecting the loops.

In testimony whereof I affix my signature.

HENRY MEYER.